(12) United States Patent
Ichino et al.

(10) Patent No.: US 7,769,753 B2
(45) Date of Patent: Aug. 3, 2010

(54) METHOD AND SYSTEM FOR RETRIEVING A DATA PATTERN

(75) Inventors: Kiyohisa Ichino, Tokyo (JP); Akihiro Motoki, Tokyo (JP)

(73) Assignee: NEC Corporation, Tokyo (JP)

( * ) Notice: Subject to any disclaimer, the term of this patent is extended or adjusted under 35 U.S.C. 154(b) by 355 days.

(21) Appl. No.: 11/045,090

(22) Filed: Jan. 31, 2005

(65) Prior Publication Data

US 2005/0171943 A1 Aug. 4, 2005

(30) Foreign Application Priority Data

Jan. 30, 2004 (JP) ............................. 2004-022842
Jan. 24, 2005 (JP) ............................. 2005-015049

(51) Int. Cl.
*G06F 7/00* (2006.01)
*G06F 17/30* (2006.01)
*G06F 12/00* (2006.01)
*G06F 13/00* (2006.01)
*G06F 13/28* (2006.01)
*G06F 15/00* (2006.01)

(52) U.S. Cl. ......................... 707/736; 711/109; 712/300
(58) Field of Classification Search ....................... None
See application file for complete search history.

(56) References Cited

U.S. PATENT DOCUMENTS 6,385,605 B1 * 5/2002 Suzuoka et al. ................ 707/4

2002/0099698 A1 * 7/2002 Abe et al. ...................... 707/3
2003/0187877 A1 * 10/2003 Kuboyama et al. ........ 707/104.1
2005/0114763 A1 * 5/2005 Nonomura et al. .......... 715/513
2005/0273450 A1 * 12/2005 McMillen et al. .............. 707/1

FOREIGN PATENT DOCUMENTS

| JP | S62-179083 A | 8/1987 |
| JP | 3-80366 A | 4/1991 |
| JP | 10-307840 A | 11/1998 |

\* cited by examiner

*Primary Examiner*—Neveen Abel Jalil
*Assistant Examiner*—Raheem Hoffler
(74) *Attorney, Agent, or Firm*—Sughrue Mion, PLLC

(57) ABSTRACT

A data retrieval system includes a retrieval request block for generating a retrieval key including a current state number and a current character string including N characters latched from an input character string, and a state transition memory operating for retrieval based on a state transition table. The state transition table includes a plurality of input entries each including a combination of a current state number and a character pattern string having N characters, and a plurality of output entries each including combination of a next state number and a pattern number of a character pattern retrieved from the input character string. The state transition memory operates for a plurality of retrievals in parallel retrieval processing.

18 Claims, 10 Drawing Sheets

REGISTRY OF PATTERN-1 TO PATTERN-3

REGISTRY OF PATTERN-4 "BCDABCD"

RESOLUTION OF PARTIAL MACHING

FINAL STATE TRANSITION DIAGRAM

| ADDRESS | 70 CAM | | 73 ASSOCIATED DATA RAM | |
|---|---|---|---|---|
| | 71 CURRENT-STATE-NUMBER STORAGE | 72 MATCHING CHARACTER STORAGE | 74 NEXT-STATE-NUMBER STORAGE | 75 PATTERN NUMBER STORAGE |
| 1 | 0 | A | 1 | 0 |
| 2 | 0 | B | 3 | 0 |
| 3 | 1 | A | 1 | 0 |
| 4 | 1 | B | 2 | 0 |
| 5 | 2 | A | 1 | 0 |
| 6 | 2 | B | 3 | 0 |
| 7 | 2 | C | 4 | 1 |
| 8 | 3 | A | 1 | 0 |
| 9 | 3 | B | 3 | 0 |
| 10 | 3 | C | 4 | 0 |
| 11 | 4 | A | 1 | 0 |
| 12 | 4 | B | 3 | 0 |
| 13 | 4 | D | 0 | 2 |
| | * | * | * | * |

METHOD AND SYSTEM FOR RETRIEVING A DATA PATTERN

BACKGROUND OF THE INVENTION (a) Field of the Invention

The present invention relates to method and system for retrieving a data pattern and, more particularly, to method and system for use in extracting a character pattern in a document file including a relatively long character string.

(b) Description of the Related Art

A deterministic finite automaton technique is generally used for extracting a specific character string, or character pattern, included in a document file having a relatively long character string. The deterministic finite automaton technique is such that a state transition table is first prepared from a specific character pattern to be extracted from a subject document file, the state transition table is stored in a content addressable memory (CAM), and the subject document file is examined based on the state transition table to thereby extract the specific character pattern from the subject document file.

FIG. 10 shows a data retrieval system described in Patent Publication JP-A-62(1987)-179083. The system, generally designated by numeral 50, includes a register 76 for consecutively latching and storing therein a character in an input character string 500, a CAM 70 for retrieving characters in the input character string 500 one by one through the register 76, an associated data RAM 73 for operating in association with the CAM 70, a state number register 77 for storing a next state number 523 for the CAM 70, and a pattern number register 78 for receiving a pattern number of the retrieved character string to output the same.

The CAM 70 includes a current-state-number storage section 71 and a matching character storage section 72. The current-state-number storage section 71 stores therein a current state number before the current transition, whereas the matching character storage section 72 stores therein a matching character which is to be matched with the input character and constitutes a condition for the state transition.

The associated data RAM 73 includes a next-state-number storage section 74 and a pattern number storage section 75. The next-state-number storage section 74 stores therein a next state number specified by the current state transition, whereas the pattern number storage section 75 stores therein a pattern number of the character pattern retrieved by the current state transition.

The state number register 77 stores therein a next state number 523 received from the next-state-number storage section 74 to provide the same to the CAM 70 as a current state number 520 for the next retrieval. The pattern number register 78 receives the pattern number stored in the pattern number storage section 75 to output the pattern number 501 of the retrieved character pattern as the output of the data retrieval system 50.

FIG. 11 shows an example of the contents of the CAM 70 and the associated data RAM 73. In this example, the system 50 retrieves a pattern-1, "ABC", having a pattern number "1" and a pattern-2, "BCD", having a pattern number "2", wherein each character pattern has a specific character string including a plurality of specific letters. In the CAM 70, each current state number stored in the current-state-number storage section 71 and each matching character stored in the matching character storage section 72 form an input entry having a specific address. The associated data RAM 73 has a plurality of output entries each having a next state number in the next-state-number storage section 74 and a pattern number in the pattern number storage section 75. Each output entry of the associated data RAM 73 is listed in association with a corresponding input entry of the CAM 70 in the state transition table.

FIG. 12 shows a state transition diagram showing the contents of the CAM 70 and the associated data RAM 73. In this diagram, each number in a circle corresponds to a state number, wherein the state number located at the base of an arrow corresponds to the current state number before the current state transition represented by the arrow, and the state number located at the tip of the arrow corresponds to the next state number after the current state transition. The letter attached with the arrow corresponds to the character retrieved from the input character string during the current state transition.

Although Patent Publication JP-A-62(1987)-179083 describes further a signal for representing success or failure in the retrieval by the CAM 70 as well as a reset circuit for resetting the state number register 77 if the CAM 70 fails to retrieve a character pattern, descriptions of these items are omitted here because these items are irrelevant to the problem of the conventional technique to be solved by the present invention.

In operation of the data retrieval system 50 shown in FIG. 10, the characters in the character string 500 of a document file are latched in the register 76 one by one. The CAM 70 receives a current state number 520 from the state number register 77 and a character 521 in the input character string 500 of the document file from the register 76, as a retrieval key for the current retrieval. The CAM 20 operates for a retrieval based on the state transition table and the retrieval key including the current state number 520 received from the state number register 77 and a character string received from the register 76, thereby delivering an address 522 of the input entry matched with the retrieval key.

The associated data RAM 73 receives an address 522 from the CAM 70, to output the contents of the output entry stored therein and specified by the address 522, the contents including a next state number 523 and the pattern number 524 of the character pattern retrieved by the CAM 70.

If the CAM 70 receives, for example, a state number "1" and a character "A" as a retrieval key, then the CAM 70 output an address "3" based on the state transition table shown in FIG. 11. In this case, the associated data RAM 73 receives the address "3" from the CAM 70 to thereby output a next state number "1" and a pattern number "0", which indicates that no pattern is found in this retrieval, as shown in FIG. 11. This is also shown in FIG. 12 by a loop arrow attached with "A" and having a base and a tip on state number "1".

In another case, if the CAM 70 receives a state number "2" and a character "C" as a retrieval key, then the CAM 70 outputs an address "7" to the associated data RAM 73, which outputs a next state number "4" and a pattern number "1", which means a pttern-1 is found in the current retrieval. This is also shown in FIG. 12 by an arrow having a base on state number "2" and a tip on state number "4" and attached with "C".

The next state number 523 is latched by the state number register 77 and used as the current state number 520 for the next retrieval in the CAM 70. The pattern number 524 is latched by the pattern number register 78, which outputs the same as the pattern number 501 of the retrieved character pattern. The data retrieval system 50 iterates the retrieval operation for all the characters in the document file 500, thereby retrieving patterns including pattern-1, "ABC", and pattern-2, "BCD".

In the conventional data retrieval system, there is a problem in that the speed of retrieval is extremely low because the CAM 70 has to wait a next state number being output as the result of the current retrieval from the associated data RAM 73, for operating the next retrieval.

SUMMARY OF THE INVENTION

In view of the above problem in the conventional technique, it is an object of the present invention to provide system and method for retrieving a data pattern including a character string at a higher speed.

The present invention provides, in a first aspect thereof, a data retrieval system for retrieving a character pattern from an input character string, including: a retrieval request block including: a shift register which has a plurality (N) of register stages and responds to a shift clock to consecutively latch characters of the input character string in the respective register stages to generate a partial character string; and a state number register for storing therein a state number, the retrieval request block outputting a retrieval key including the partial character string stored in the shift register and a state number stored in the state number register at each cycle of the shift clock; and a state transition memory for receiving the retrieval key at the each cycle to operate a retrieval based on the retrieval key, the state transition memory storing therein a state transition table having a plurality of input entries and a plurality of output entries each corresponding to one of the input entries, each of the input entries having a combination of a current state number and a matching character pattern including N characters obtained from the character pattern by dividing the character pattern if the character pattern includes characters in number larger than the N, each of the output entries having a combination of a next state number and a pattern number specifying the character pattern which is retrieved as a result of a state transition from the current state number to the next state number effected by any of characters in the matching character pattern, the state transition memory operating for a plurality of the retrieval in parallel retrieval processings, to thereby output the next state number and the pattern number as a result of each of the retrievals, the state number register receiving and storing therein the next state number output from the state transition memory.

The present invention provides, in a second aspect thereof, a method for retrieving a character pattern from an input character string, including the steps of: storing in a memory a state transition table having a plurality of input entries and a plurality of output entries each corresponding to one of the input entries, each of the input entries having a combination of a current state number and a matching character pattern including N characters obtained from the character pattern by dividing the character pattern if the character pattern includes characters in number larger than the N, each of the output entries having a combination of a next state number and a pattern number specifying the character pattern which is retrieved as a result of a state transition from the current state number to the next state number effected by any of characters in the matching character pattern; responding to a shift clock to consecutively latch characters of the input character string to form a partial character string including N characters; generating a retrieval key including the partial character string including N characters and a state number at each cycle of the shift clock; and operating a retrieval for each of the partial character strings based on the state transition table while operating a plurality of the retrieval in parallel retrieval processings, to thereby output the next state number and the pattern number as a result of each of the plurality of retrievals, wherein the retrieval key generating step uses, in a retrieval of a current partial character string, the next state number generated from a preceding partial character string which is N characters succeeding to the current partial character string.

In accordance with the system and method of the present invention, the parallel retrieval processings can conceal the delay incurred by the preceding retrieval in the state transition memory to initiate the retrieval for the succeeding retrieval before the end of the preceding retrieval, thereby allowing a high-speed retrieval of the character pattern.

In the configuration wherein the state transition table includes the input entry and the output entry in association with each other, if an input character string retrieves a plurality of character patterns, each of the plurality of character patterns thus retrieved may be specified at the location of the output entry corresponding to the location of the character in the corresponding matching character pattern by which the character pattern is retrieved. In addition, one of the thus retrieved character patterns may be selected by a specific rule.

The above and other objects, features and advantages of the present invention will be more apparent from the following description, referring to the accompanying drawings.

PREFERRED EMBODIMENT OF THE INVENTION

Figure 1:
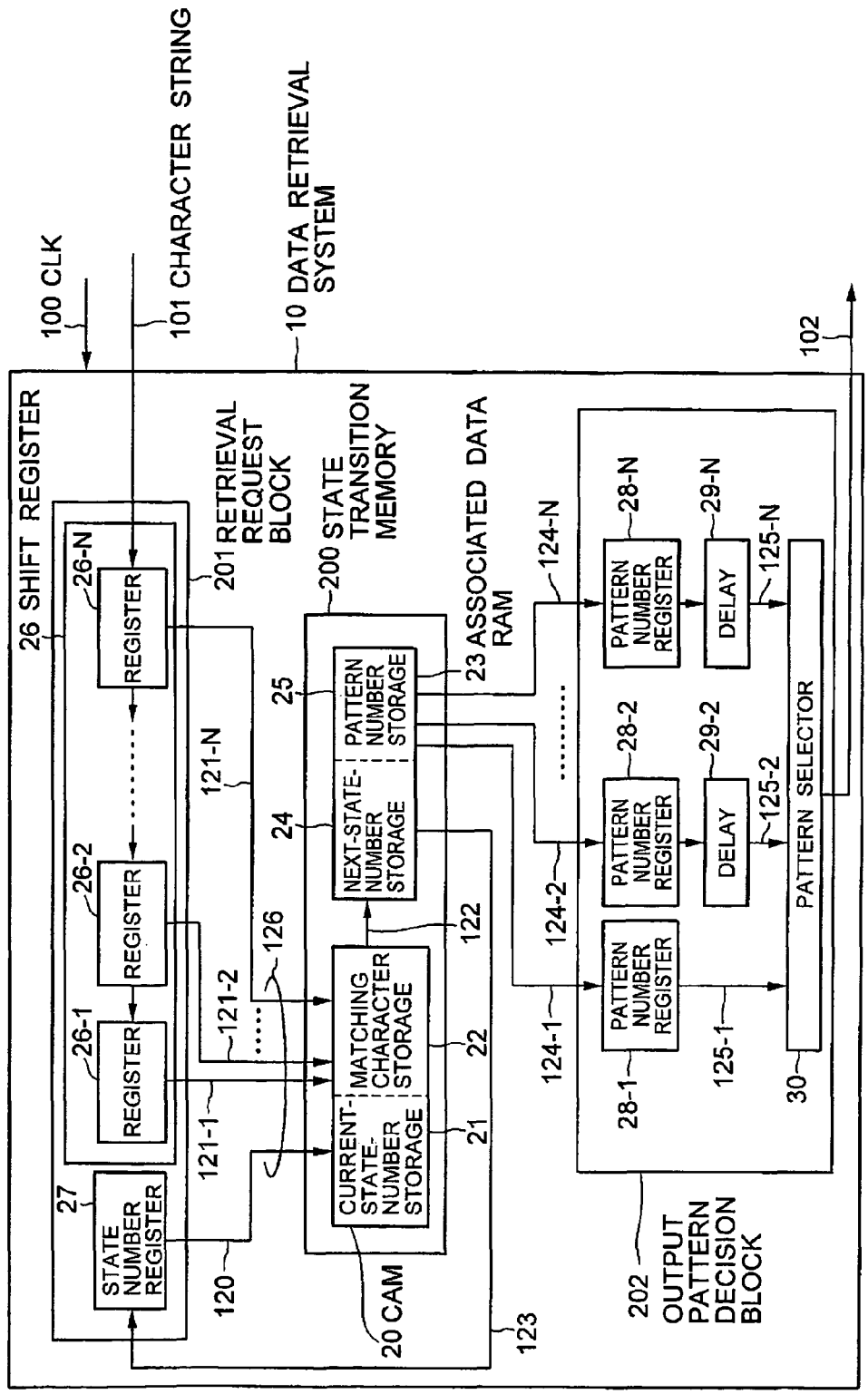
FIG. 1 is a block diagram of a data retrieval system according to a first embodiment of the present invention.

Now, the present invention is more specifically described with reference to accompanying drawings, wherein similar constituent elements are designated by similar reference numerals.

Referring to FIG. 1, a data retrieval system, generally designated by numeral 10, according to a first embodiment of the present invention includes a state transition memory 200, a retrieval request block 201 and an output pattern decision block 202. The relationships between the character patterns and the state transitions in the deterministic finite automaton are provided beforehand. The data retrieval system 10 operates for a pattern retrieval based on the deterministic finite automaton in the document file including an input character string 101, delivering a pattern number 102 of the character pattern retrieved by the matching procedure in the state transition memory 200.

A clock signal 100 drives the data retrieval system 10, which operates in synchrony with the clock signal 100. For the purpose of simplicity in the description, it is assumed here that the data retrieval system 10 operates in synchrony with the rising edges of the clock signal 100. The input character string 101 includes one or more of characters, which are latched in the data retrieval system 10 one by one from the head of the character string toward the end thereof. The term "character" used herein may include a binary data in addition to the character recognized as such by human beings. The number of bits representing a single character is not limited to any number, and the character may be represented by eight or sixteen bits, for example.

The retrieval request block 201 includes a shift register 26 for consecutively latching and storing therein characters in the input character string 101 to generate a partial character string, and a state number register 27 for storing therein a current state number. The retrieval request block 201 has functions of receiving the input character string 101 to generate a retrieval key, and delivering the same to the state transition memory 200.

The shift register 26 includes a plurality (N≧2) of character registers 26-1 to 26-N each storing therein a character appearing in the input character string 101. At an initialized state, each of these character registers 26-1 to 26-N stores therein a particular common character, such as "-", which is to be never included in the input character string 101. The characters stored in the character registers 26-1 to 26-N are consecutively shifted to the left one stage by one stage at the rising edges of the clock signal 100. More particularly, the character stored in character register 26-M (2≦M≦N) is shifted to character register 26-(M-1), and a next character latched in the shift register 26 is stored in character register 26-N. The state number register 27 latches a next state number at a rising edge of the clock signal 100 in the last stage of the current retrieval, and stores therein the same as a current state number.

The shift register 26 delivers a character string including N characters 121-1 to 121-N from the character registers 26-1 to 26-N to the state transition memory 200. The state number register 27 delivers the current state number 120 stored therein to the state transition memory 200. The state transition memory 200 receives the character string including characters 121-N to 121-N and the current state number 120 as a combinational retrieval key 126.

It is assumed here that the input character string 101 includes data "ABCDABC . . . " and the number of the registers is three (N=3), for example. When the shift registers 26-1, 26-2 and 26-3 store therein the top three characters, i.e., store therein "A", "B" and "C", respectively, the retrieval request block 201 delivers a retrieval key including the state number 120 and a character string "ABC" to the state transition memory 200 at a rising edge of a clock pulse in the clock signal 100. The characters are then shifted in the shift register 26 by one stage at the next clock pulse. Thus, the retrieval request block 201 delivers, at the next clock pulse, a retrieval key including a current state number 120 for the next retrieval and a character string "BCD" to the state transition memory 200.

The state transition memory 200 stores therein a state transition table corresponding to the character patterns to be retrieved from the input character string 101. The state transition table includes a plurality of input entries each including a combination of a current state number and a character pattern used as a state transition condition, and a plurality of output entries each including a next state number and pattern numbers of the character patterns which are retrieved during transition from the current state number to the next state number. The input entry and the corresponding output entry are tabulated in association with each other.

The state transition memory 200 receives the retrieval key 126 from the retrieval request block 210, retrieves a next state number 123 and a pattern number or pattern numbers 124-1 to 124-N from the state transition table, and outputs the next state number 123 and the pattern numbers as resultant outputs thereof. The state transition memory 200 operates for parallel retrieval processings, by receiving a retrieval key before the retrieval for the preceding retrieval key is finished in the state transition memory 200.

Figure 2:
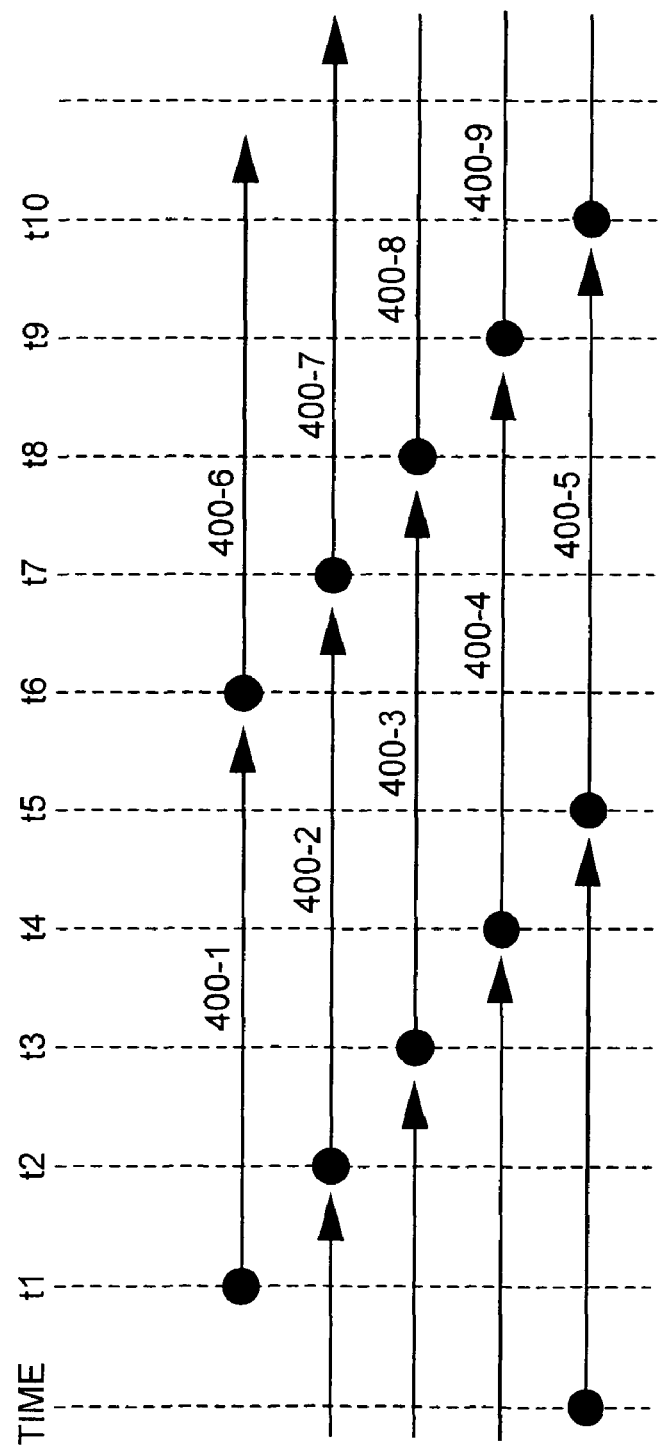
FIG. 2 is a time chart showing the procedure of the retrieval by the CAM in the data retrieval system of FIG. 1.

FIG. 2 shows an exemplified time chart of the parallel retrieval processings in the state transition memory 200. In this figure, a single arrow indicates a single retrieval from the start to the end thereof. In this case, N=5 and thus the state transition memory 200 operates for parallel five retrievals at a time, e.g., retrievals 200-1 to 200-5, based on different retrieval keys. For example, retrieval 200-1 starts upon the input of a first retrieval key 126 from the retrieval request block 201 at time instant t1, and comes to an end between time instants t5 and t6, delivering the results of retrieval 200-1. The fact that the retrieval 200-1 comes to an end between time instants t5 and t6 means that a corresponding next retrieval 200-6 can be started at time instant t6 based on the result of the retrieval 200-1. Retrieval 200-2 starts upon the input of a second retrieval key 126 from the retrieval request block 201 at time instant t2 and comes to an end between time instants t6 and t7, delivering the results of the retrieval 200-2. Other retrievals start at respective clock cycles and come to ends similarly. Five retrievals corresponding to "N=5" are performed in parallel retrieval processings without awaiting the ends of the preceding retrievals. The results of the retrievals are output in the order of the occurrences.

In the present embodiment, the state transition memory 200 includes a combination of the CAM 20 and the associated data RAM 23, which store in advance the data used for the state transitions in the deterministic finite automaton. The state transition memory 200 can be implemented by a known CAM (CAM NSE5512 from NetLogic Microsystems Inc.) and a SRAM on the commercial market.

The technique for preparing the state transition table will be described hereinafter with reference a concrete example. The state transition table is generally prepared by the steps of preparing a state transition diagram based on the character pattern to be retrieved, and converting the state transition diagram thus prepared to the state transition table. The following example is described assuming that the character patterns to be retrieved in the input character string include pattern-1, "E", pattern-2, "BC", pattern-3, "ABCDE", and pattern-4, "BCDABCD", with N=3.

In the present embodiment, the state transition proceeds with the condition specified by a character string including N characters. The preparation of the state transition diagram includes three main steps including registry of character patterns to be retrieved, resolution of partial matching of the character pattern, and completion of the state transition diagram.

Registry of Character Patterns in Step-1

This step starts from the initial situation, adds an arrow having a next state based on each character string in the character pattern to be retrieved, and iterates a registration of arrows for all the character patterns to be retrieved. In the initial situation, no character pattern is registered, thus there only exists an initial state "0" in the state transition diagram. A practical procedure for a character pattern works as follows. The character pattern to be retrieved is divided into a set of character strings each including N characters, while picking up N characters in the character pattern from the head to the end thereof (step 1-1). Then, the state transition diagram is traced from the initial state "0" based on the obtained character strings set. The nearest character string to the head of the pattern is evaluated first, and the farthest string is evaluated last. Evaluation for the character string is repeated until the character string reached the end of the character pattern. For each character string, the evaluation process works as follows. It is judged in a noticed state whether or not there exists a next state corresponding to the processed character string. If there exists a next state corresponding to the character string, the process advanced along the arrow to the next state and the noticed state is updated to the next state.

Otherwise, it creates a new state corresponding to the character string, whose state number is newly assigned, adds an arrow for the added state to the noticed state, then advances to the next state along the newly added arrow. This process is continued until the tracing based on the divided character strings is performed for the end of the character pattern (step 1-2). Finally, a correspondence is added between the last character string and the pattern number of the character pattern in order to identify the character pattern. (step 1-3). This process from step 1-1 to 1-3 is executed for all of the character patterns.

Figure 3A:
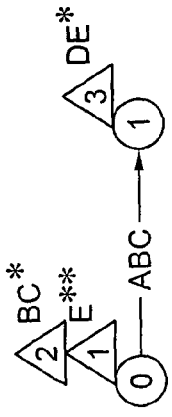
FIGS. 3A to 3D are partial state transition diagrams each showing a procedure for preparing a state transition diagram.

The process of step-1 will be further described with reference to FIG. 3 for the case of exemplified pattern-4 "BCDABCD". It is to be noted that pattern-1 to pattern-3 are registered before registry of pattern-4, as shown in FIG. 3A. In each of the states in FIGS. 3A to 3D, a numeral "x" in a circle represents the state number, whereas the combination of a numeral "y" in a triangle and a character string "z" associated therewith means that if a character string which matches with the character string "z" is input in the state "x", then the character pattern having a pattern number "y" is retrieved in the document file.

First, pattern-4 "BCDABCD" is divided into character strings each having N (N=3) characters, whereby three character strings "BCD", "ABC" and "D" are obtained in this order. If the last character string has characters in number less than N=3, as in the case of "D", then the characters are arranged in the leftmost positions of the character string, with the remaining space or spaces being filled with asterisks (*), which mean that the corresponding positions are not the subject to be compared. In the case of the last character string "D", the final character string is "D". Thus, transitions corresponding to three character strings "BCD", "ABC" and "D" are to be added in the state transition diagram as detailed below.

Figure 3B:
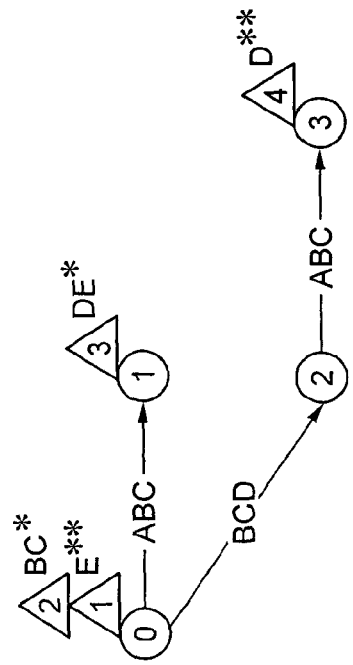

In the initial state "0" shown in FIG. 3A, an arrow having a next state number "2" is added corresponding to an input character string which matches with "BCD", as shown in FIG. 3B. Then, an arrow having a next state number "3" is added to the state number "2", corresponding to an input character string which matches with "ABC". Thereafter, since the remaining character string "D" is the last character string in the character pattern, a correspondence is placed between the character string "D" and the pattern number "4" of the pattern-4. More specifically, if a character string which matches with "D" is input in the sate "3", then it can be said that pattern-4 is retrieved. Thus, pattern number "4" in a triangle associated with the character string "D" is added to the state number "3" in the state transition diagram, as will be understood from FIG. 3B.

Resolution of Matching with Part of Character Pattern in Step-2

Mere registry of the character patterns to be retrieved in the state transition diagram does no allow a character string which matches with part of the character pattern to be retrieved. For example, if a character string "ABC" is input in the state "2" in FIG. 3B, the state itself shifts from "2" to "3". In this case, since the character string "ABC" is also the transition condition from the state "0" to the state "1", the pattern "3" is also retrieved if a pattern "DE*" is input subsequent to the input of pattern "3". Thus, if a pattern string "ABC"+"DE*" is input in the state "2", both the pattern-3 and pattern-4 are retrieved. Thus, it is necessary to place a correspondence in the state "3" between the input character string "DE*" and pattern-3 as well as pattern-4, as shown in FIG. 3C.

The resolution of the partial pattern matching should be conducted for each of the state numbers. In a practical procedure, it is sufficient to assure whether or not there is character string matching with a part of the character pattern in the noticed state number and having a base on a state which has a smaller number of transitions from the initial state "0" compared to the number of transitions of the noticed state from the initial state "0". For example, for assuring the state "2", since the number of transitions of the noticed state "2" from the initial state "0" is only one as shown in FIG. 3C, it is sufficient to observe a transition from a state having zero transitions from the initial state "0", i.e., to observe a transition from the initial state and examine whether or not the observed initial state is associated with a part of the character pattern on the noticed state.

Completion of State Transition Diagram in Step-3

Figure 3C:
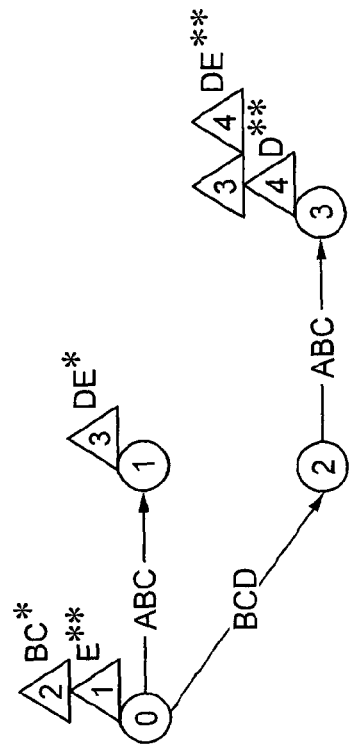
Figure 3D:
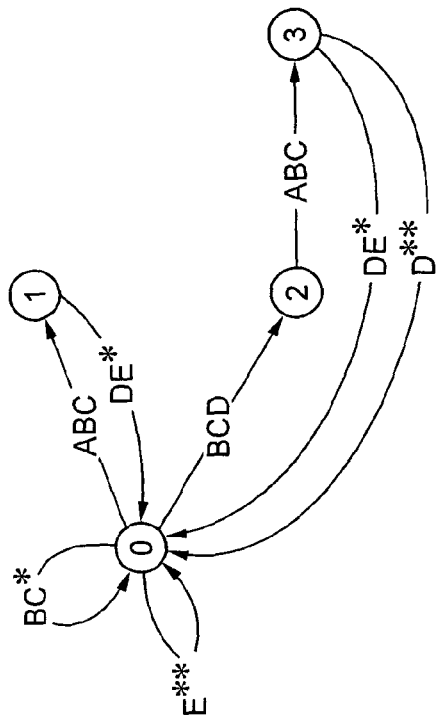

In the state transition diagram of FIG. 3C, transitions directed to the initial state "0" by the associated character strings are then added to the states each associated with the pattern number along with the character string and having no next state, to obtain the final state transition diagram of FIG. 3D. That is, if a character string "DE*" is input in the state "1", for example, in FIG. 3C, then the pattern-3 is matched, without no next state from the state "1". The fact that there is no next state from the noticed state by the matched character string means that the noticed state shifts to the initial state "0" by the transition effected by the matched character string, "DE*". The thus added transitions complete the state transition diagram, as shown in FIG. 3D, which is again shown in FIG. 4 together with the matched character patterns.

Figure 4:
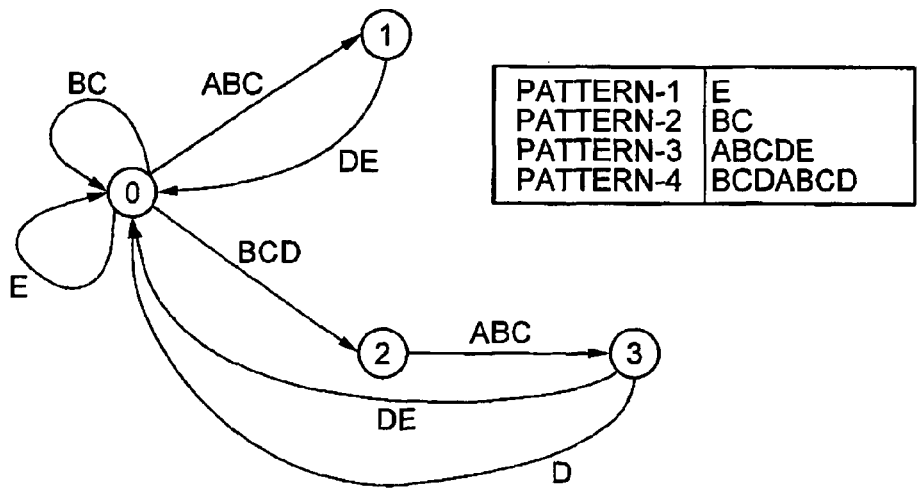
FIG. 4 is a practical example of the final state transition diagram of the deterministic finite automaton in the first embodiment.
Figure 5:
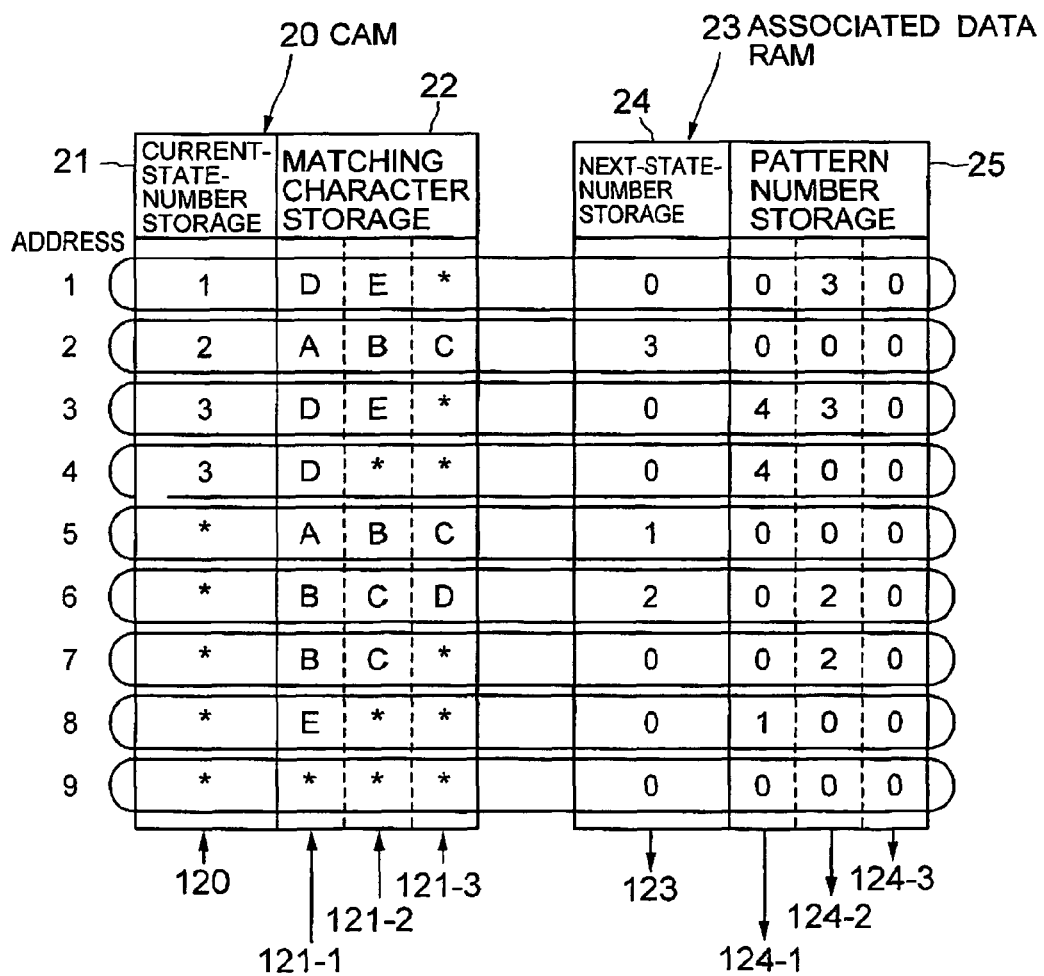
FIG. 5 shows the contents of the state transition table stored in the state transition storage section.

FIG. 5 shows the contents of the state transition table, which is obtained from the state transition diagram in association with the matched patterns, as shown in FIG. 4, and stored in the state transition memory 200. The state transition table tabulating a plurality of input entries each representing a state transition is stored in the CAM 20 and the associated data RAM 23. Each entry (input entry) of the CAM 20 includes a current-state-number storage section 21 for storing therein a current state number before the transition and a matching pattern storage section 22 for storing therein a matching character pattern used as the condition for the state transition. The matching pattern storage section 22 has a capacity for storing therein N characters. If the number of characters stored in the matching pattern storage section 22 is less than N, the characters are stored in the leftmost positions with the remaining spaces being filled with asterisks representing "Don't Care".

The CAM 20 used herein has a function of detecting a full matching, and also has a function of detecting a partial matching. More specifically, the CAM 20 stores therein three different values, i.e., "0", "1" and "Don't Care", wherein the last value means that there is no character to be matched. In addition, if there are a plurality of matched entries in the CAM 20 during a retrieval, one of the entries having a smallest address is selected for the result of matching. If, for example, a retrieval key including a state number 120="2", and input characters 12-1="A", 120-2="B" and 120-3="C" is input to the CAM 20, an address "2" having a smallest address number is selected and output from the CAM 20, although entries of addresses "2", "5" and "9" are matched.

Each entry (output entry) of the associated data RAM 23 includes a next-state-number storage section 24 for storing therein a next state number after the state transition, and a pattern number storage section 25 capable of storing therein N pattern numbers detected by the state transition. Pattern "0" stored in the pattern number storage section 25 indicates that no character pattern is matched by the state transition.

The matched pattern numbers are stored in the pattern number storage section 25 in the manner as detailed below. In short, the pattern number storage section 25 determines the location where the character pattern is found in a character string in the matching pattern storage section 22. For example, the pattern number of the character pattern detected at the first character in a character string is stored in the first column of the pattern number storage section 25. Similarly, the pattern number of the character pattern detected at the second or third character in a character string is stored in the second or third column of the pattern number storage section 25, respectively. More concretely, if the matching pattern storage section 22 of an entry stores therein "BCD", the pattern-2 "BC" should be detected by the second character in "BCD". Thus, the pattern number storage section 25 stores the pattern number "2" in the second column thereof, whereby the pattern numbers stored in the pattern number storage section is "020".

After storing the state transitions in the CAM 20, the blanks of each entry are filled with asterisks (*). In addition, all the state number storage sections 24 not specified in the associated data RAM 23 are filled with "0". This forces the current state to shift to the initial state "0" after the transition, if the retrieval key is not matched with any of the entries in the CAM 20.

In a more general representation, the state transition table is stored in the CAM 20 and the associated data RAM 23, as follows. A state transition diagram is first prepared based on the character patterns to be retrieved. Thereafter, all the state transitions described in the state transition diagram thus prepared are stored in the entries so that each entry includes a single transition.

The storage of the state transition table should satisfy the following two conditions:
(1) The transitions from the initial state "0" are stored in the entries each having an address larger than the addresses of the other transitions; and
(2) As to the two transitions effected from a single current state, one of the two transitions having, as the condition for transition, a character string which includes a larger number of characters is stored in a smaller address compared to the address of the other of the two transitions having a character string which includes a smaller number of characters.

In the resultant state transition table, the contents "0" of the current-state-number storage section 21 in the CAM 20 are replaced by asterisks (*).

The functions of the CAM 20 and associated data RAM 23 will be described hereinafter. The CAM 20 retrieves the entries by using a retrieval key including the current state number 120 and the character string including characters 121-1 to 121-N, delivering the address 122 of the entry thus retrieved to the associated data RAM 23. The CAM 20 can start for the retrieval operation at least once for each clock cycle of the clock signal 100. Thus, the CAM 20 can operate for a plurality of retrievals in parallel retrieval processings. It is to be noted that there is no restriction in the present invention as to the time length of the retrieval from the time instant of retrieval request to the time instant of output of the resultant address 122. Although the CAM 20 in the present embodiment starts for a retrieval at each clock cycle of the clock signal 100, the CAM 20 may start for a retrieval at each k cycles of a clock signal so long as the clock signal having a frequency equal to k times the frequency of the clock signal 100 is used for operating the CAM 20.

The associated data RAM 23 reads out the contents of the entry corresponding to the address 122 input from the CAM 20, delivering the read-out contents as the next state number 123 and the pattern numbers 124-1 to 124-N. The associated data RAM 23 can start for the read-out processing at least once for each clock cycle of the clock signal 100. Thus, the associated data RAM 23 can operate for a plurality of read-outs in parallel read-out processings. It is to be noted that there is no restriction as to the delay time, i.e., time length from the input of the address 122 to the output of the next state number 123 and the pattern numbers 124.

Although the associated data RAM 23 in the present embodiment starts for a read-out at each clock cycle of the clock signal 100, the associated data RAM 23 may start for a retrieval at each k cycles of a clock signal so long as the clock signal having a frequency equal to k times the frequency of the clock signal 100 is used for operating the associated data RAM 23.

The state number register 27 latches, at the rising edge of the clock signal 100, the next state number 123 delivered from the associated data RAM 23, and stores the same therein. The initial value of the state number register 27 is "0". The state number register 27 delivers the state number stored therein as a current state number 120 for the next retrieval.

The pattern number decision section 202 includes N pattern number registers 28-1 to 28-N, (N−1) delay circuits 29-2 to 29-N each associated with a corresponding one of pattern number registers 28-2 to 28-N, and a pattern number selector (pattern selector) 30. Each pattern number register 28-M (1≦M≦N) latches a corresponding pattern number 124-M delivered from the associated data RAM 23. The output of each pattern number register 28-M (2≦M≦N) is delayed by a corresponding delay circuit 28-M by a time length equal to (M−1) periods of the clock signal 100, to be delivered as a pattern number 125-M.

The pattern selector 30 receives pattern numbers 125-1 to 125-N, to select and output one of the pattern numbers 125-1 to 125-N having a largest value, as an output pattern number 102. This allows the pattern number of the character pattern having the largest pattern number among the retrieved pattern numbers to be output as a detected character pattern, if a plurality of character patterns are retrieved at the same time. For example, if an input character string 101 includes "ABCDE", then both pattern-1 "E" and pattern-3 "ABCDE" are simultaneously retrieved at the last character "E". In this case, pattern number "3" of pattern-3 is selected by the pattern selector 30 because of the largest pattern number. In an alternative, the pattern selector 30 may select a character pattern having a smallest pattern number or select based on another specific rule.

The optimum value of N is determined as follows. N is a natural number, and determined by the sum (AT) of the maximum value of the time length needed for the retrieval by the CAM 20 and the maxim value of the time length needed for the read-out by the associated data RAM 23. The optimum value of N is selected as a value of N satisfying the following relationship:

$$N \times CT = AT \quad (1)$$

where CT is a period of the clock signal 100.

The number N of stages of the shift register 26, which is equal to the number of characters of the character string used in the retrieval key, may be any number not lower than two, although the optimum value of N for most efficiently performing the retrieval is determined by the relationship (1) as described above.

If the number N of characters used in the retrieval key is larger than the above optimum value, then a next state number 123 is delivered from the state transition memory 200 before the retrieval request block 201 receives a next character string, which is latched N characters after the preceding character string, based on which a current state number 120 for the next character string is obtained. This causes a miss-match of the timing between the current state number 120 delivered from the state number register 27 and the N characters 121-1 to 121-N in the retrieval key 126. In this case, the next state number 123 delivered from the state transition memory 200 should be delayed by a delay circuit before input to the state number register 27. The delay time may be determined based on the ratio (N−AT)/CT.

On the other hand, if the number N is smaller than the above optimum value, then operation of the retrieval request section 201, i.e., latch of the input character string 101 in the shift register 26 and output of the retrieval key 126, for a subject character string should be stopped until the results of the retrieval, based on which a preceding character string, which is output N characters before the subject character string, are delivered from the state transition memory 200.

Figure 6:
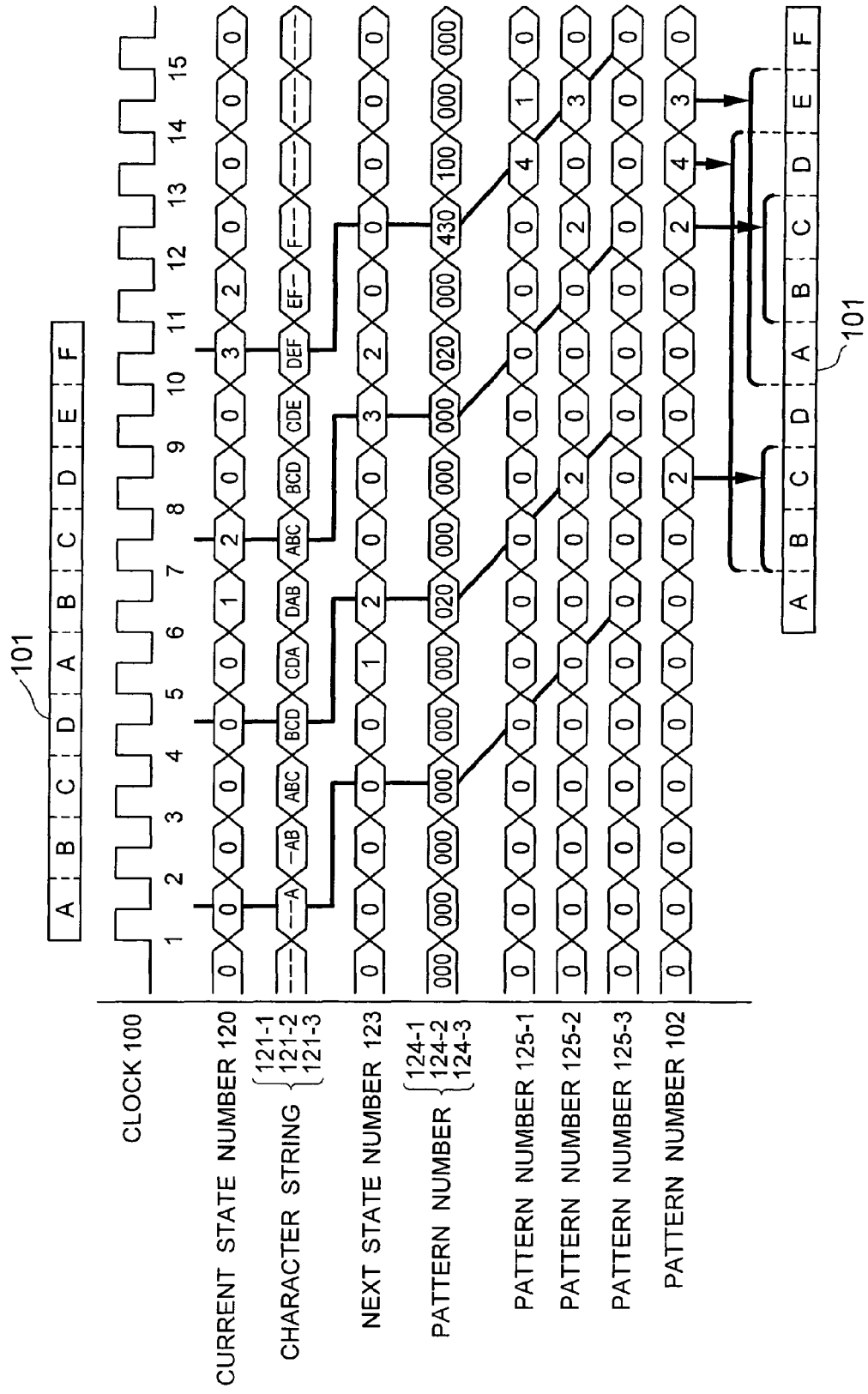
FIG. 6 is a time chart showing operation of the data retrieval system of the first embodiment.

A practical example of operation of the data retrieval system 10 of FIG. 1 will be described hereinafter. FIG. 6 shows a timing chart of the signals in the data retrieval system 10 for the case where N=3 and the input character string 101 includes "ABCDABCDEF". It is assumed that the CAM 20 and associated data RAM 23 store therein the state transition table shown in FIG. 5, whereby the data retrieval system 10 retrieves pattern-1 "E" and pattern-4 "BCDABCD", as described before, based on the state transition diagram shown in FIG. 4. In the following description, operation starting from the tenth rising edge of the clock signal 100 will be exemplified. Operation at other timing may be understood from this example.

At the tenth rising edge in the clock signal 100 in FIG. 6, the characters stored in the character registers 26-1 to 26-3 are shifted to the left by one stage, whereby tenth character "F" is latched in character register 26-3. Thus, the character registers 26-1 to 26-3 store therein "DEF". In addition, the state number register 27 latches therein the next state number "3" and thus renders the current state to assume "3".

The retrieval request section 201 delivers a combinational retrieval key 126 including the current state number 120, "3", and characters 121-1 to 121-N, "DEF", to the CAM 20, which starts for a retrieval based on the input retrieval key 126. In this case, the addresses matched with the input retrieval key 126 include "3", "4" and "9", as will be understood from FIG. 5, wherein address "3" is selected on the principle of selecting a smallest address. The CAM 20 outputs an address 122, "3", based on which the associated data RAM outputs the entry specified by address "3" whereby the next sate number 123 assumes "0" and pattern numbers 124-1 to 124-3 assume "4", "3" and "0", respectively.

In this example, both the retrieval by the CAM 20 and the read-out by the associated data RAM 23 require three clock cycles of the clock signal 100 because N=3 is selected. Thus, the state number register 27 latches the next state number 123, "0", and pattern number registers 28-1 to 28-3 latch pattern numbers 124-1 to 124-3, "430", after three cycles elapsed since the current state number 120, "3", and characters 121-1 to 121-3, "DEF" are input to the CAM 20. In parallel to these retrieval and read-out processings, retrieval and read-out processings based on the retrieval key 126, including the current state number "1" and characters "EF-", input at the eleventh rising edge as well as based on the retrieval key 126, including the current state number "0" and characters "F--", input at the twelfth rising edge are performed in the CAM 20 and the associated data RAM 23.

The pattern number 125-1, which is an output from pattern number register 28-1, assumes "4" at the thirteenth rising edge of the clock signal 100. The output from pattern number register 28-2 is delayed by delay circuit 29-2 by one clock cycle of the clock signal 100, whereas the output from pattern number register 28-3 is delayed by delay circuit 29-3 by two clock cycles of the clock signal 100. Thus, pattern number 125-2 assumes "3" at the fourteenth rising edge of the clock signal 100, whereas pattern number 125-3 assumes "0" at the fifteenth rising edge.

At the thirteenth rising edge of the clock signal 100, the pattern numbers 125-1 and 125-3 assume "400", whereby the pattern selector 30 selects the maximum value, "4", among the pattern numbers and outputs this pattern number, "4", which designates pattern-4 "BCDABCD". Thus, the data retrieval system 10 retrieves pattern-4 in the input character string 101. By iterating the above procedure, the data retrieval system 10 of the present embodiment retrieves desired character patterns in the document file.

It is to be noted that the conventional data retrieval system operates the state transition once for each character. Thus, in the conventional technique, a state transition by a character cannot be determined until the state transition based on the preceding character determines the own next state number. In other word, in the conventional technique, a character cannot be input to the CAM until the preceding retrieval is finished. In the present embodiment, since the state transition memory 200 stores therein a state transition table, which allows a state transition to be performed based on a character string including N characters, the state transition memory 200 delivers a next state number and a plurality of pattern numbers corresponding to the input retrieval key. In addition, the state transition memory 200 operates for a plurality of retrievals in parallel retrieval processings, to thereby achieve a higher-speed retrieval compared to the conventional technique.

In summary, the data retrieval system of the present embodiment has features of a state transition memory 200 having a function of parallel retrieval processings, a state transition table allowing a unit retrieval based on N input characters, and a CAM 20 capable of storing therein "don't care" mark if the character string used in the unit retrieval includes characters in number less than N which is specified in the state transition table.

A data retrieval system according to a second embodiment of the present invention has a configuration similar to the configuration of the data retrieval system 10 of the first embodiment. As described above, the data retrieval system of the first embodiment uses a constant time length for retrieving based on a retrieval key including N characters. On the contrary, the data retrieval system of the second embodiment has a variable time length for performing a retrieval. In addition, the state number register, such as 27 in FIG. 1, has a function of storing therein N state numbers, at a maximum, delivered as the results of the retrieval. The data retrieval system of the second embodiment of the present invention will be described hereinafter, with the reference numerals being common to the first embodiment for a better understanding of the present embodiment.

Figure 7:
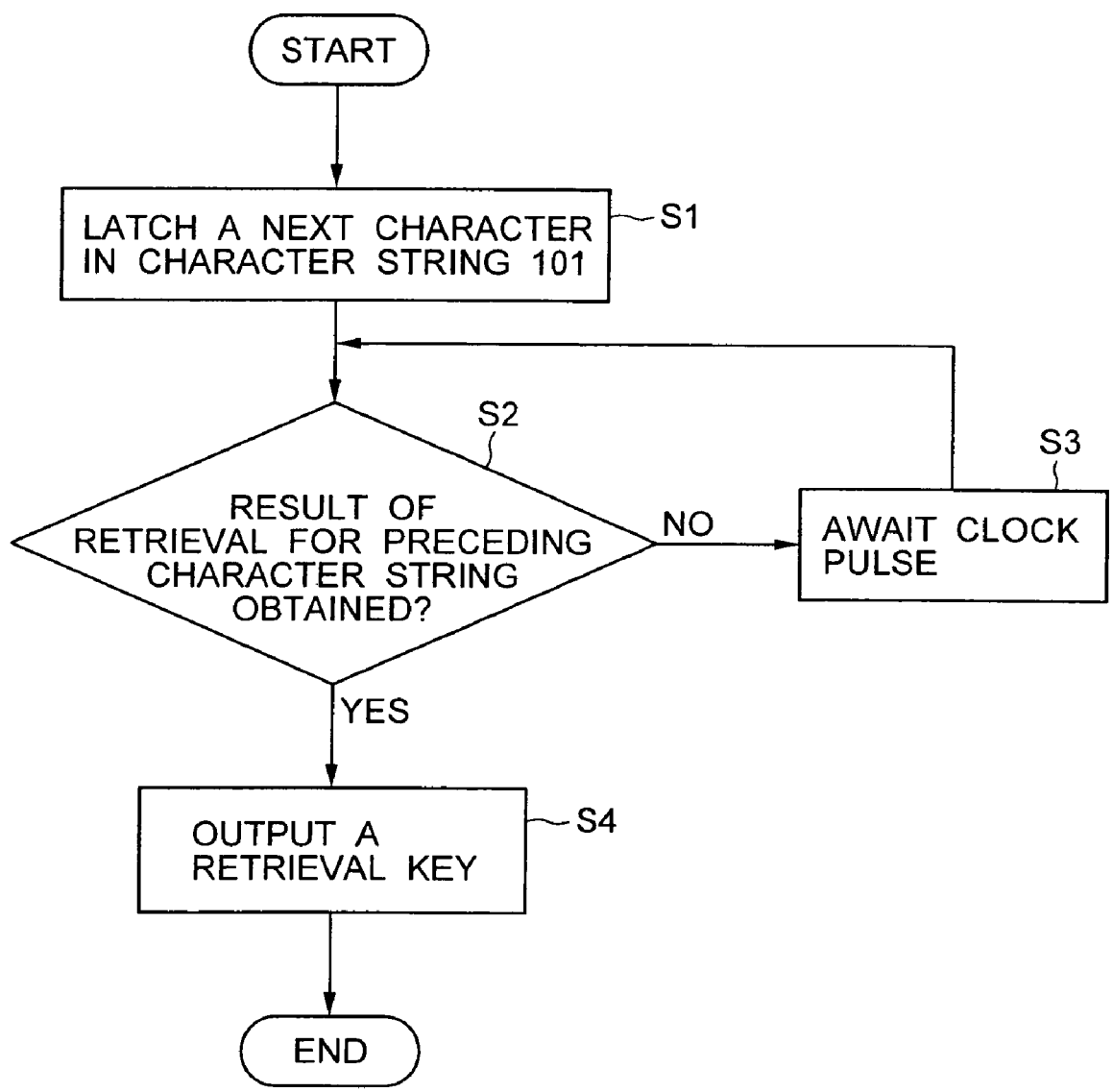
FIG. 7 is a flowchart of a data retrieval system according to a second embodiment of the present invention.

FIG. 7 shows the procedure of preparation of the retrieval key 126 by the retrieval request block 201 in the second embodiment. The data retrieval system 10 latches a next character in the input character string 101 in synchrony with a rising edge of the clock signal 100 (step S1). The retrieval request block 201 judges whether or not the state number is received in the state number register 27 from the state retrieval memory 200, as the result of the preceding retrieval based on the character string, which is N characters preceding to the current character string (step S2). This step is necessary because there is no guarantee in the present embodiment that the result of the preceding retrieval is obtained for the current retrieval due to a variable time length for the retrieval.

Assuming that N=3 and the input character string includes "ABCDEF", if the sixth character "F" is latched in step S1, it is judged in step S2 whether or not the result of the retrieval based on character string "ABC", which is three characters preceding to the current character string "DEF" stored in the shift register 26, has been obtained. If the retrieval request block 201 judges in step S2 that the result of the preceding retrieval has not been obtained, the retrieval request block 201 waits a next pulse in the clock signal 100 (step S4) to return to step S2. The retrieval request block 201, if it judges in step S2 that the result of the preceding retrieval has been obtained, prepares a retrieval key including N characters and a current state number for the next retrieval, and delivers the resultant retrieval key to the state transition memory 200 (step S4).

Figure 8:
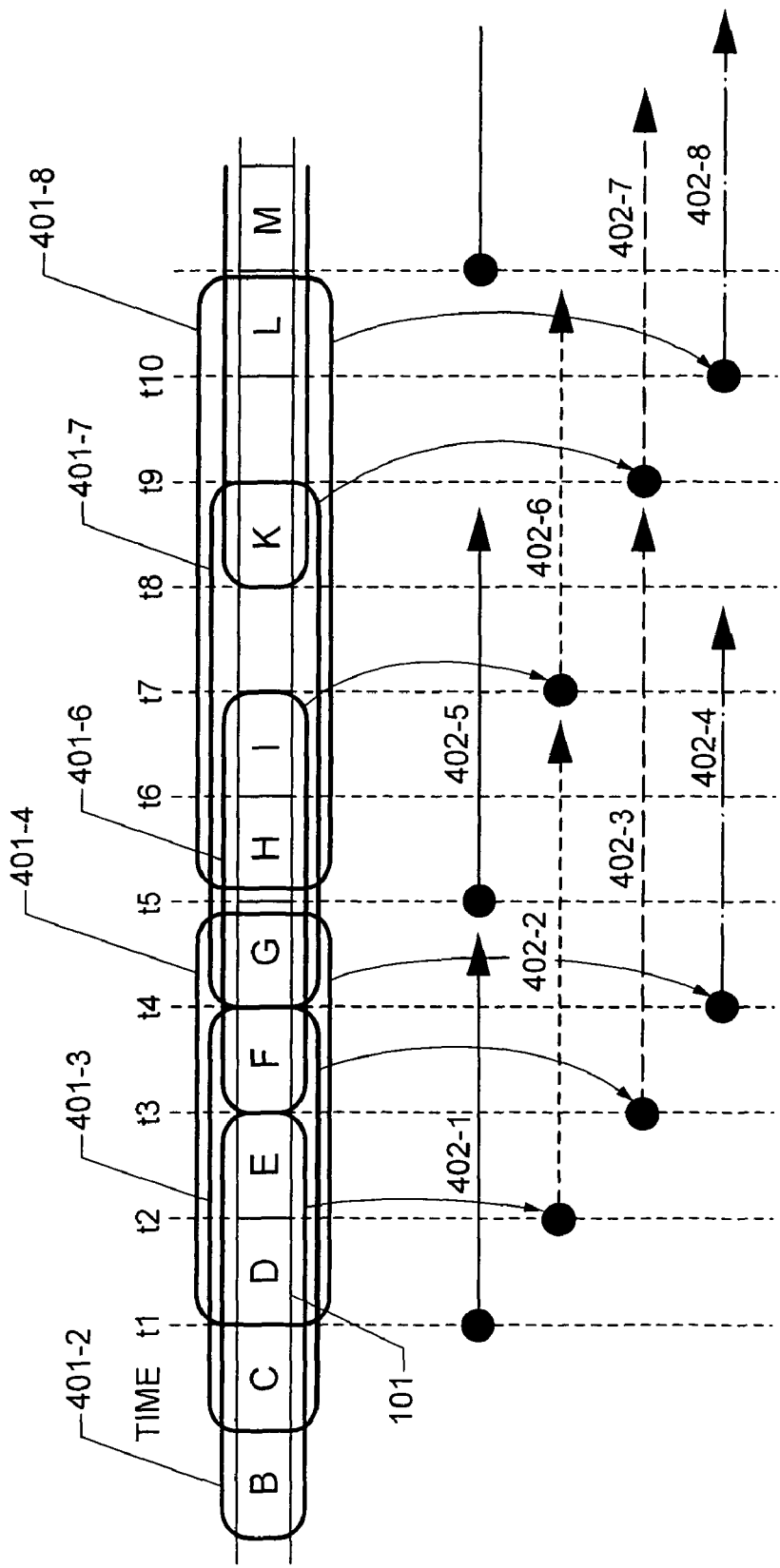
FIG. 8 is a time chart showing operation of the data retrieval system of the second embodiment.

FIG. 8 shows the timing chart showing parallel retrieval processings in the state transition memory 200 in the present embodiment. In this example, N=4 is assumed, and the input character string includes "ABCDEFGHIKLM...". The input character string is divided into character strings 401-1, 401-2, 401-3, . . . , each including four characters. At the sixth rising edge (t6) of the clock signal 100, the retrieval request block 201 latches character "I" to prepare a character string 401-6, "FGHI", including character "I" at the end thereof (step S1), and judges whether or not the result of retrieval for the character string 401-2, "BCDE", which is four characters preceding to the current character string 401-6, "FGHI" (step S2).

In FIG. 8, retrieval 402-2 for character string 401-2 is not yet finished so that the result of retrieval 402-2 is not yet obtained. Thus, the retrieval request block 201 waits for one clock cycle in step S4, and again judges at t7 whether or not the result of preceding retrieval 402-2 is obtained. The preceding retrieval 402-2 for character string 401-2 is finished between t6 and t7, whereby the state number register 27 receives the next state number as the result of the preceding retrieval 402-2 at t7. The retrieval request block 201 judges at t7 that the result of preceding retrieval 402-2 has been obtained, delivering a retrieval key including the content of the state number register 27 and character string 401-6 to the state transition memory 200. These procedures are performed by a wired logic circuit.

The state transition memory 200 starts for retrieval 402-6 at t7 based on the input retrieval key 126 including character string 401-6 and the state number 120. The retrieval request block 201 then latches at t8 a character "K", and then judges whether or not the result of the preceding retrieval 402-3 for character string 401-3 has been obtained. Since the result is obtained between t8 and t9, the retrieval request block waits for one clock cycle and delivers a retrieval key for the next retrieval 402-7 including the sate number 120 and the character string 401-7. Thus, the state transition memory 200 starts for retrieval 402-7 for character string 401-7.

In the present embodiment, since the time length needed for each retrieval is varied in the state transition memory 200, the result of a retrieval for a character string may be obtained prior to the result of the retrieval for a preceding character string. For avoiding the problems of this inversion of orders, the state number register 27 has a function of storing therein a plurality of state numbers. In this case, the maximum number of the state numbers stored in the state number register 27 is equal to the number N of parallel processings. That is, the state number registers 27 can store therein N state numbers at a maximum.

For example, as shown in FIG. 8, retrieval 402-7 for character string 401-7 is performed based on the result of the preceding retrieval 402-3 for character string 401-3. In the exemplified time chart, the results of the retrievals 402-4 and 402-5 for character strings 401-4 and 401-5, which are started after the retrieval 402-3 for character string 401-3, are obtained before t9 at which the retrieval 402-7 for character string 401-7 is to be started. In this case, the state number register 27 stores therein the results of the retrievals 402-4 and 402-5 for character strings 401-4 and 401-5 in order to use these results for the later retrievals. The result of the retrieval 402-4 for character string 401-4, "DEFG", stored in the state number register 27 is delivered as the current state number 120 to the state transition memory 200 at t10 at which retrieval 402-8 for character string "HIKL" 401-8 is to be started. The results of the retrievals stored in the state number register 27 are deleted at a suitable timing after the results are delivered to the state transition memory 200 in association with the character strings as the retrieval keys.

As described in the present embodiment, the retrieval based on the input retrieval key 126 is finished with a variable time length in the state transition memory 200. For conforming to the variable time length, input of the retrieval key is delayed until the result of the preceding character string which is N characters preceding to the current character string.

Figure 9:
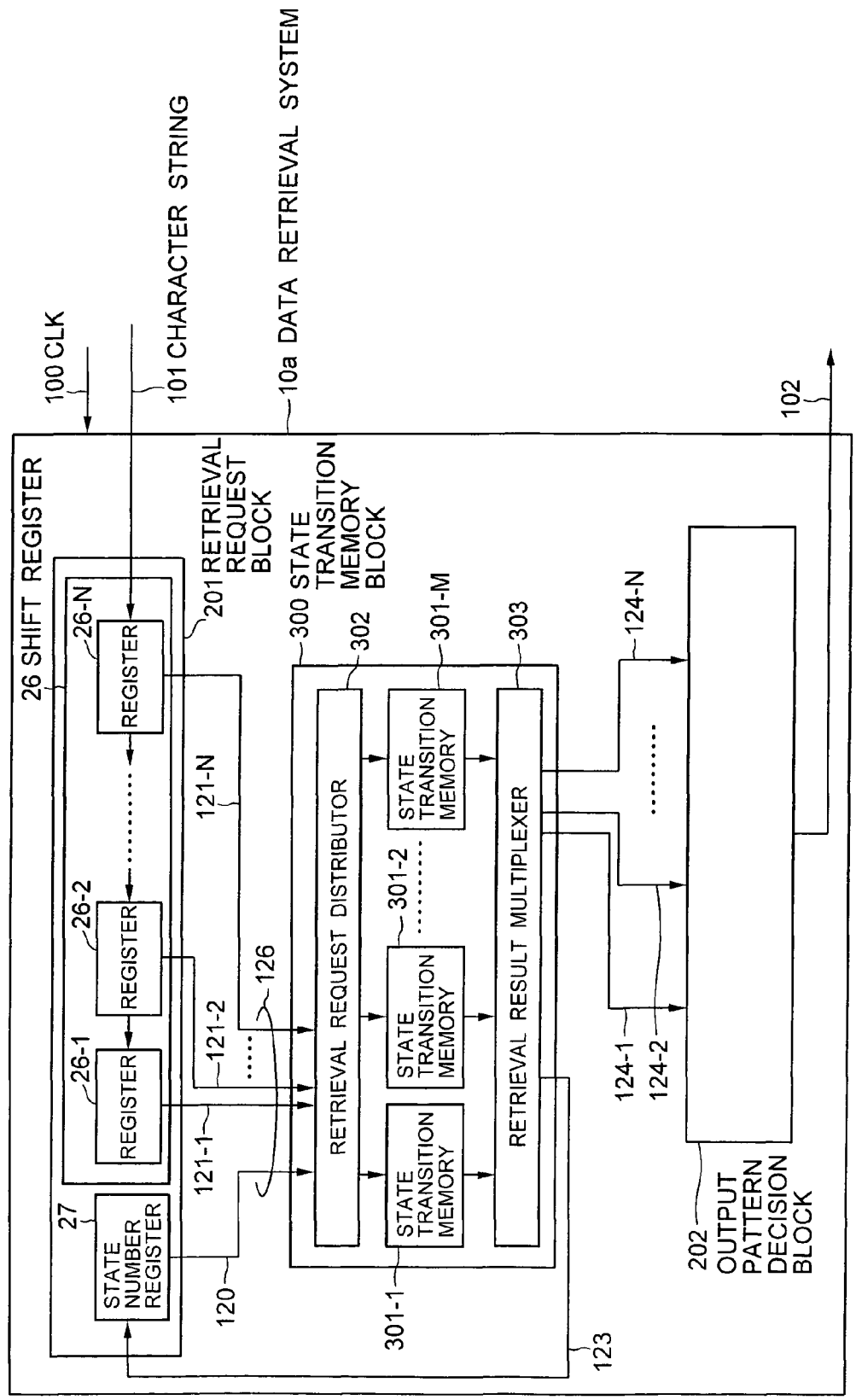
FIG. 9 is a block diagram of a data retrieval system according to a third embodiment of the present invention.
Figure 10:
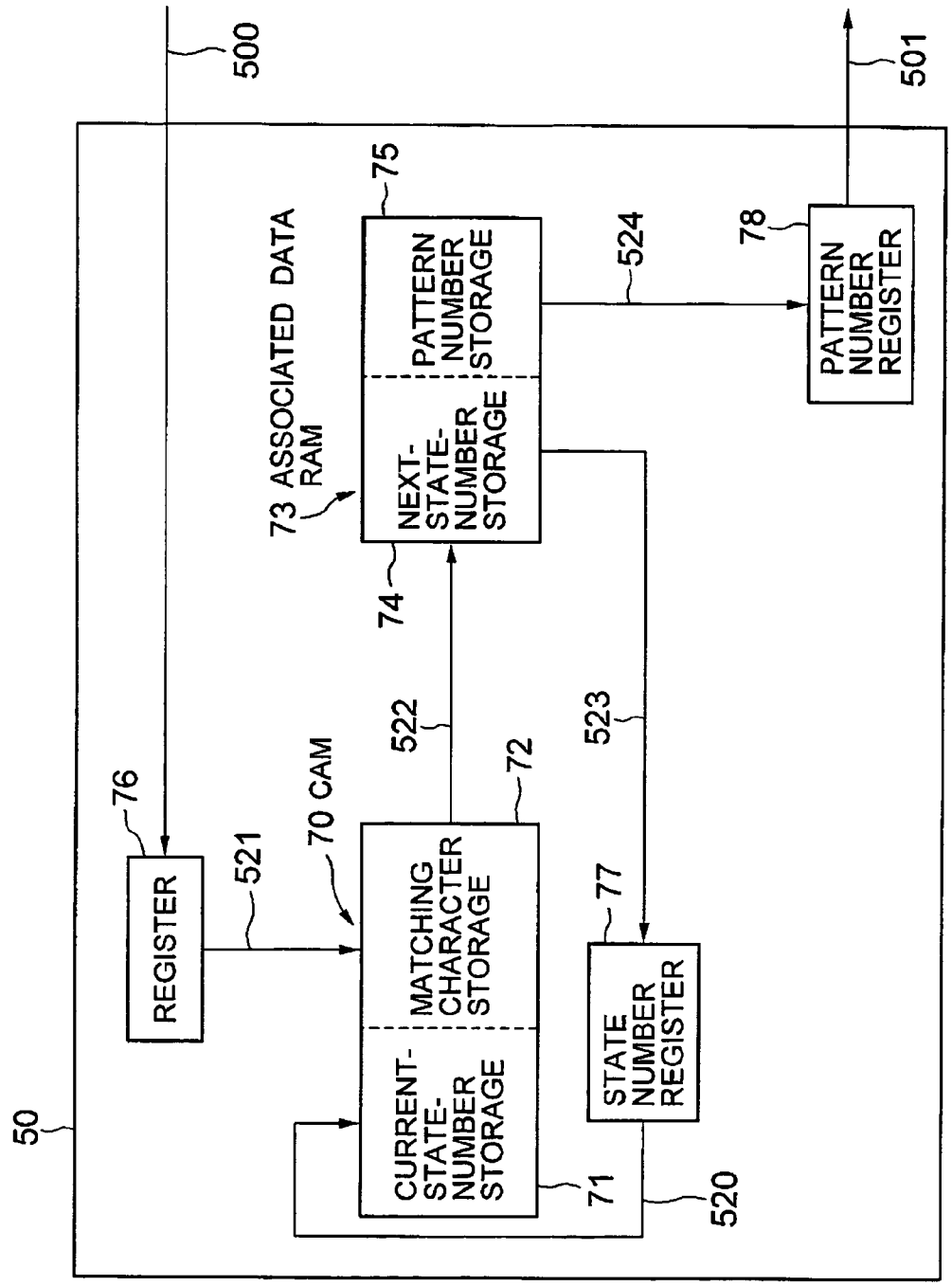
FIG. 10 is a block diagram of a conventional data retrieval system.
Figures 11, 12:
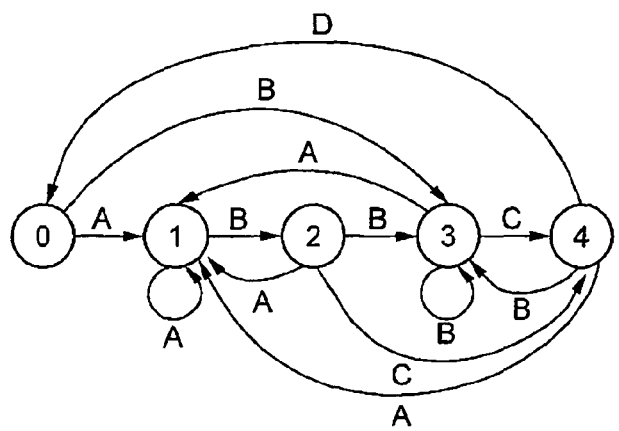
FIG. 11 is a practical example of a state transition table used in the conventional data retrieval system.
FIG. 12 is a practical example of the state transition diagram corresponding to the state transition table of FIG. 11.

FIG. 9 shows a data retrieval system, generally designated by numeral 10a, according to a third embodiment of the present invention. The data retrieval system of the present embodiment is similar to the data retrieval system 10 of the first embodiment except for the configuration of the state transition memory block 300 used in the present embodiment. The state transition memory block 300 includes a retrieval request distributor 302, a plurality (M≧2) of state transition memories (memory sections) 301-1 to 301-M, and a retrieval result multiplexer 303.

Each of the state transition memories 301-1 to 301-M stores therein a state transition table such as shown in FIG. 4 prepared from a state transition diagram, and operates for retrieval based on the state transition table. Each state transition memory 301 may have any configuration so long as it has the specified function. For example, each state transition memory 301 may have a configuration similar to that of the state transition memory 200 in the first embodiment, may have a function of operating for a single retrieval based on a retrieval key instead of operating for parallel retrieval processings, or may use another type of state transition table.

The retrieval request distributor 302 selects one of the state transition memories 301-1 to 301-M upon receiving a retrieval key 126 from the retrieval request block 201, delivering the retrieval request key 126 to the selected state transition memory 301. It is preferable for the retrieval request distributor 302 to select a state transition memory 301 which is idle at the stage of selection.

The selected state transition memory 301 receives the retrieval key to operate for a retrieval based on the state transition table, thereby delivering a next state number and character patterns retrieved as the results of the retrieval. The retrieval result multiplexer 303 receives the results of retrievals from the state transition memories 301-1 to 301-M, multiplexes the results of the retrievals, and delivers the next state number 123 and the pattern numbers 124-1 to 124-N.

In the present embodiment, the parallel processing function can be achieved by using a plurality of state transition memories each having a single processing function at a time instead of the parallel processing function.

Since the above embodiments are described only for examples, the present invention is not limited to the above embodiments and various modifications or alterations can be easily made therefrom by those skilled in the art without departing from the scope of the present invention.

What is claimed is:

1. A data retrieval system for retrieving a character pattern from an input character string, comprising:
   a processor;
   a retrieval request block including: a shift register, having N register stages, for responding to a shift clock to consecutively latch characters of said input character string in respective said register stages to generate a first partial character string; and a state number register which stores, using the processor, a first state number, said retrieval request block outputting a first retrieval key including said first partial character string stored in said shift register and the first state number at a first cycle of said shift clock; and
   a state transition memory for receiving said first retrieval key at said first cycle to operate a first retrieval based on said first retrieval key, said state transition memory storing therein a state transition table having a plurality of input entries and a plurality of output entries each corresponding to one of said input entries,
   wherein an input entry of the plurality of input entries has a combination of a current state number and a matching character pattern including N characters obtained from said character pattern by dividing said character pattern if said character pattern includes characters in number larger than N,
   wherein an output entry of the plurality of output entries has a combination of a next state number and a pattern number specifying said character pattern, said pattern number being retrieved as a result of a state transition of the first state number from said current state number to said next state number effected by characters in said matching character pattern,
   wherein said state transition memory outputs said next state number and said pattern number as a result said first retrieval, said state number register receiving and storing therein said next state number output from said state transition memory,
   wherein the state transition memory performs a plurality of parallel retrievals including a second retrieval which is performed based on a second retrieval key including a second partial character string stored in said shift register at a second cycle of said shift clock,
   wherein said second retrieval is performed before said state transition memory outputs the result of the first retrieval,
   wherein the first and the second retrievals are performed on the same input character string.

2. The data retrieval system according to claim 1, wherein said state transition table has data specifying one of said N characters, by which said character pattern is retrieved, in said matching character pattern.

3. The data retrieval system according to claim 1, wherein said characters in said matching character pattern include a mark or marks of "don't care", which is not to be compared with any of characters in said first retrieval key.

4. The data retrieval system according to claim 1, wherein said state number register outputs, as said first state number in said first retrieval key, said next state number obtained by retrieval for a preceding partial character string which is N characters preceding to the first partial character string.

5. The data retrieval system according to claim 4, wherein a time length of said first retrieval is equal to times lengths of each of said plurality of parallel retrievals.

6. The data retrieval system according to claim 4, wherein a time length of said first retrieval is variable, and said retrieval request block detects before outputting said first retrieval key whether or not another next state number obtained from said preceding partial character string is received.

7. The data retrieval system according to claim 1, wherein said state transition memory includes a plurality of memory sections each operating for a single retrieval processing at a time, and a retrieval key distributor for distributing said first retrieval key to one of said memory sections which is now idle.

8. A method for retrieving a character pattern from an input character string, comprising:
   storing in a memory a state transition table having a plurality of input entries and a plurality of output entries each corresponding to one of said input entries, wherein an input entry of the plurality of input entries has a combination of a current state number and a matching character pattern including N characters obtained from said character pattern by dividing said character pattern if said character pattern includes characters in number larger than N, wherein an output entry of the plurality of output entries has a combination of a next state number and a pattern number specifying said character pattern, said character pattern number being retrieved as a result of a state transition of a first state number from said current state number to said next state number effected by characters in said matching character pattern;
   responding to a shift clock to consecutively latch characters of said input character string to form a first partial character string including N characters;
   generating a first retrieval key including said first partial character string and said first state number at a first cycle of said shift clock;
   operating a first retrieval based on said first retrieval key and said state transition table to output said next state number and said pattern number as a result of said first retrieval; and,
   operating a plurality of parallel retrievals including a second retrieval which is performed based on a second retrieval key including a second partial character string at a second cycle of said shift clock,
   wherein said second retrieval is performed before said state transition memory outputs the result of the first retrieval, wherein the first and the second retrievals are performed on the same input character string.

9. The method according to claim 8, wherein said state transition table has data specifying one of said N characters, by which said character pattern is retrieved, in said matching character pattern.

10. The method according to claim 8, wherein said characters in said matching character pattern include a mark or marks of "don't care" which is not to be compared with any of characters in said first retrieval key.

11. The method according to claim 8, wherein a time length of said first retrieval is equal to time lengths of each of said plurality of retrievals.

12. The method according to claim 8, wherein a time length of said first retrieval is variable, and said method further comprises detecting, before outputting said first retrieval key, whether or not another next state number obtained from a preceding partial character string is received, said preceding partial character string being N characters preceding to the first partial character string.

13. The method according to claim 8, wherein said method follows a deterministic finite automaton technique.

14. The method according to claim 8, wherein said next state number is used in a later retrieval based on a later partial character string which is N characters succeeding to said first partial character string, said later partial character string being different from said second partial character string.

15. The data retrieval system according to claim 1, wherein the second retrieval is initiated before the first retrieval is finished, such that the first and second retrievals are performed in parallel.

16. The method according to claim 8, wherein the second retrieval is initiated before the first retrieval is finished, such that the first and second retrievals are performed in parallel.

17. The data retrieval system according to claim 1, wherein the second retrieval key is retrieved before the first retrieval is completed.

18. The method according to claim 8, wherein the second retrieval key is retrieved before the first retrieval is completed.

* * * * *